United States Patent Office 2,776,271
Patented Jan. 1, 1957

2,776,271

MIXTURES COMPRISING ACRYLONITRILE POLYMERS CONTAINING ALKENYL CARBONAMIDES AND POLYACRYLONITRILE

Harry W. Coover, Jr., and Joseph B. Dickey, Kingsport, Tenn., assignors to Eastman Kodak Company, Rochester, N. Y., a corporation of New Jersey No Drawing. Application October 21, 1952, Serial No. 316,051

4 Claims. (Cl. 260—45.5)

This invention relates to composite resinous compositions comprising a mixture of acrylonitrile polymers containing amide groups and polyacrylonitrile.

This application is a continuation-in-part of our copending application Serial No. 198,761, filed December 1, 1950, now United States Patent 2,620,324 which discloses and claims the preparation of the acrylonitrile polymers containing amide groups as employed in practicing this invention and their utility as fiber-forming materials.

It is known that polyacrylonitrile fibers can be spun which have excellent physical properties such as high strength, high sticking temperatures and good resistance to shrinkage at elevated temperatures. However, such fibers show certain disadvantageous properties which severely limit their commercial use such as low moisture absorption and more especially poor dyeability with most available dyes of the cellulose acetate, direct cotton, acid wool and vat types of dyes. For a great many textile purposes, improved dyeability of polyacrylonitrile fibers or fibers produced from polymers containing a high percentage of acrylonitrile would be highly desirable.

It is further known that greatly increased moisture absorption and dyeability of acrylonitrile fibers can be obtained by copolymerizing acrylonitrile with certain other unsaturated compounds whose polymers are known to have good affinity for various dyes. While this procedure does give polymeric products having improved dyeability, a serious drawback arises in certain instances in that the fiber produced shows a materially lower softening point, thus limiting their practical uses. Another procedure employed for the purpose of increasing the dye affinity of polyacrylonitrile has been to mix the polyacrylonitrile, before spinning, with other film-forming materials which are known to be readily dyeable. However, it has been well established that acrylonitrile polymers are incompatible with most other polymeric materials. Out of many hundreds of synthetic polymers that have been tested, only a relatively small number of them have been found sufficiently compatible. For example, it can be demonstrated that mixtures of polyacrylonitrile with polyvinyl acetate, when dissolved in N,N-dimethyl formamide in proportions varying from 15 to 50 percent by weight of the polyvinyl acetate and from 85 to 50 percent by weight of the polyacrylonitrile, form grainy dopes which separate on standing into two liquid layers, and that fibers formed from such mixtures show segmentation into their individual components along their horizontal axes.

We have now found that stable, homogeneous solutions comprising two different acrylonitrile polymers which do not separate into distinct layers on standing, and from which fibers of good dyeability and excellent physical properties can be spun, can be obtained by dissolving in acrylonitrile polymer solvents, in individual order or in intimate admixture polyacrylonitrile and an acrylonitrile polymer, the latter being prepared by homopolymerizing acrylonitrile in the presence of an isolated polymer or interpolymer of an amide of an $\alpha,\beta$-monoethylenically unsaturated aliphatic carboxylic acid containing from 3 to 5 carbon atoms in the acid radical. The acrylonitrile polymers and polyacrylonitrile are compatible with one another in all proportions.

It is, accordingly, an object of our invention to provide composite, resinous compositions comprising certain acrylonitrile polymers, containing $\alpha,\beta$-monoethylenically unsaturated aliphatic carboxylic amide groups, intimately admixed with polyacrylonitrile. Another object is to provide a process for preparing these compositions. A further object is to provide homogeneous and stable solutions of the compositions. A still further object is to provide fibers prepared therefrom. Other objects will become apparent from a consideration of the following description and examples.

In accordance with our invention, we prepare the composite, resinous compositions of the invention by intimately mixing or by dissolving in any proportions, but preferably in the proportion of from 5 to 95 parts by weight of an acrylonitrile polymer, prepared by homopolymerizing from 5 to 95 percent by weight of acrylonitrile in the presence of from 95 to 5 percent by weight of a polymer of an amide of an $\alpha,\beta$-monoethylenically unsaturated aliphatic carboxylic acid containing from 3 to 5 carbon atoms in the acid radical, and from 95 to 5 parts by weight of polyacrylonitrile in a solvent such as dimethyl formamide, dimethyl acetamide, gamma-butyrolactone, ethylene carbonate, ethylene cyanohydrin, etc. The solutions thus obtained are clear and homogeneous and do not separate into two layers on standing or during spinning operations. Fibers can be spun from such solutions (dopes) by either the wet or dry spinning methods. The concentration of the polymers in the solvent can vary widely from very low (less than 1%) to much higher concentrations, but for efficient operations the concentration is advantageously from 5–20 percent or higher. The dopes are stable over the usual temperature range of operations for spinning.

The acrylonitrile polymers employed in the practice of our invention as one of the components of the mixture can be termed "place" polymers and are prepared by polymerizing acrylonitrile monomer in the presence of certain $\alpha,\beta$-monoethylenically unsaturated aliphatic carbonamide homopolymers or interpolymers. The homopolymers of the $\alpha,\beta$-monoethylenically unsaturated aliphatic carbonamides are especially useful, although interpolymers thereof can also be used to advantage. Such interpolymers contain advantageously from 25 to 95 percent by weight of the $\alpha,\beta$-monoethylenically unsaturated aliphatic carbonamide and from 75 to 5 percent by weight of another ethylenically unsaturated, polymerizable organic compound containing a —CH=C< group or more especially a $CH_2$=C< group, Formulas I and II, respectively. Suitable $\alpha,\beta$-monoethylenically unsaturated aliphatic carbonamides whose polymers can advantageously be employed in practicing our invention comprise the acrylamides, citraconamides, itaconamides, maleamides, etc. (e. g. amides of alkenyl carboxylic acids containing from 3 to 5 carbon atoms in the acid radical). The acrylamides provide polymers which are especially useful in practicing the invention.

The acrylamides whose polymers can be advantageously used in our invention comprise those represented by the following general formula:

III.

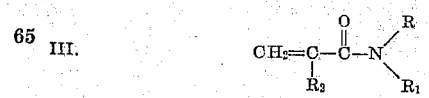

wherein R and $R_1$ each represents a hydrogen atom or alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4), and $R_2$ represents a hydrogen atom or a methyl group. Typical acrylamides include acrylamide, N-methylacrylamide, N-ethylacrylamide, N-isopropylacrylamide, N-n-butylacrylamide, methacrylamide, N-methylmethacrylamide, N-ethylmethacrylamide, N-isopropylmethacrylamide, N,N-dimethylacrylamide, N,N-diethylacrylamide, N,N-dimethylmethacrylamide, etc.

The itaconamides whose polymers we can advantageously use comprise those represented by the following general formula:

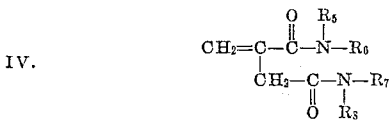

IV.

wherein $R_5$, $R_6$, $R_7$, and $R_8$ each represents a hydrogen atom, a methyl group, an ethyl group, etc. Typical itaconamides include itaconamide, N-methyl itaconamide, N-ethyl itaconamide, N,N'-dimethyl itaconamide, N,N'-dimethyl itaconamide, etc.

The citraconamides whose polymers we can advantageously use comprise those represented by the following general formula:

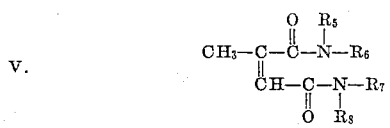

V.

wherein $R_5$, $R_6$, $R_7$, and $R_8$ have the values given above. Typical citraconamides include citraconamide, N-methyl citraconamide, N-ethyl citraconamide, N,N'-diethyl citraconamide, etc.

Other amides whose polymers are useful in practicing our invention include, for example, α-chloroacrylamide, α-chloro-N-methylacrylamide, etc.

The monoethylenically unsaturated compounds represented by Formulas I and II, whose interpolymers are useful in practicing our invention, comprise the α,β-monoethylenically unsatuated aliphatic carbonamides represented by Formulas III, IV, and V above, as well as methyl acrylate, ethyl acrylate, n-propyl acrylate, isopropyl acrylate, n-butyl acrylate, isobutyl acrylate, methyl methacrylate, ethyl methacrylate, n-propyl methacrylate, isopropyl methacrylate, n-butyl methacrylate, isobutyl methacrylate (e. g. alkyl acrylates containing from 1 to 4 carbon atoms in the alkyl group), vinyl acetate, vinyl propionate, styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinylphthalimide, ethylene, vinyl fluoride, perfluoroethylene, vinylpyridines, etc.

The polymerization is advantageously carried out in an aqueous medium, although other reaction media, such as organic solvents, can be employed; for example, a polymerization medium consisting of aqueous acetone, or other aqueous solvent can be used.

The polymerization can be accelerated by the use of a well known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal ammonium persulfate, etc.). Other catalysts such as the ketazines, azines, etc. can be used. The quantity of catalyst used can be varied, depending on the monomer, amount of diluent, etc.

The temperatures at which the process of our invention can be carried out vary from ordinary room temperature to the reflux temperature of the reaction mixture. Generally a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The polymer of the α,β-monoethylenically unsaturated aliphatic carbonamide can advantageously be suspended in an aqueous medium containing the polymerization catalyst, and the suspension (or solution) heated for a time (e. g. 30 minutes to 24 hours) prior to the addition of the acrylonitrile, and the mixture then subjected to polymerizing conditions. Alternatively, the polymer of the α,β-monoethylenically unsaturated aliphatic carbonamide can be added to an aqueous mixture (solution or emulsion) containing the acrylonitrile and polymerization catalyst, and the mixture then subjected to polymerizing conditions. The acrylonitrile monomer and the polymer of the α,β-monoethylenically unsaturated aliphatic carbonamide can be mixed together, and the mixture added to an aqueous medium containing a polymerization catalyst.

The following examples will serve to illustrate further the manner whereby we practice our invention.

*Example 1*

2.0 g. of poly-N-methylacrylamide were dissolved in 100 cc. of water containing 0.1 g. of ammonium persulfate, 0.1 g. of potassium bisulfite, and 8.0 g. of acrylonitrile. The resulting solution was allowed to polymerize for 16 hours at 25° C., and the resulting polymer was filtered off. After drying there was obtained a product weighing 8.7 g. It was found to contain 19 percent by weight of N-methylacrylamide on analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained by preparing a solution of a mechanical mixture of one part of the above polymer and one part of polyacrylonitrile and extruding the solution into a precipitating bath, had a tenacity of 3.4 g. per denier, an extensibility of 19 percent, a sticking temperature of 210° C., and shrank only 8 percent in boiling water. The fibers contained 9.5 percent N-methylacrylamide by analysis.

*Example 2*

3.0 g. of an interpolymer of acrylonitrile and N-methylmethacrylamide containing 76 percent by weight of N-methylmethacrylamide were dissolved in 100 cc. of water, along with 0.1 g. of ammonium persulfate and 0.1 g. of potassium bisulfite. The resulting solution was tumbled end-over-end for 18 hours at 25° C., and 7.0 g. of acrylonitrile were then added, and the polymerization allowed to continue for 48 hours at 25° C. The resulting polymeric material was precipitated by the addition of acetone, and then collected by centrifuging. After drying, there were obtained 9.2 g. of polymeric material containing 19 percent by weight of N-methylmethacrylamide.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 75 parts polyacrylonitrile and 25 parts of the above polymer and extruding the solution into a precipitating bath, had a tenacity of 3.2 g. per denier, an extensibility of 21 percent, a sticking temperature of 205° C. and shrank only 6 percent in boiling water.

Example 3

1.0 g. of poly-N-isopropylacrylamide was added to 60 cc. of water containing 1 cc. of 7-ethyl-2-methylundecan-4-sulfonic acid sodium salt (Tergitol No. 4). The mixture was then tumbled end-over-end for 1 hour at 50° C. The solution was cooled and 8.5 g. of acrylonitrile, 0.1 g. of ammonium persulfate, and 0.1 g. of sodium bisulfite were added. The polymerization was effected by tumbling for 16 hours at 25° C. The polymer was obtained in an 85 percent yield and contained 10 percent by weight of N-isopropylacrylamide.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 5 parts polyacrylonitrile and 95 parts of the above polymer and extruding the solution into a precipitating bath, had a tenacity of 3 grams per denier, an extensibility of 23 percent, a sticking temperature of 220° C. and shrank only 10 percent in boiling water.

Example 4

3.0 g. of an interpolymer of N,N-dimethylacrylamide and vinyl acetate containing 60 percent by weight of N,N-dimethylacrylamide were dissolved in 50 cc. of a 50 percent solution of acetonitrile in water. There were then added 6.0 g. of acrylonitrile, 0.1 g. of ammonium persulfate, and 0.1 g. of sodium bisulfite. The polymerization was effected by heating for 16 hours at 40° C. The precipitated polymer was obtained in a 72 percent yield and contained 29 percent by weight of the amide-vinyl acetate interpolymer upon analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 25 parts polyacrylonitrile and 75 parts of the above described polymer and extruding the solution into a precipitating bath, had a tenacity of 3.6 g. per denier, an extensibility of 24 percent, a sticking temperature of 200° C. and shrank only 8 percent in boiling water.

Example 5

2.0 g. of an interpolymer of N-methylacrylamide and acrylamide containing 30 percent by weight of N-methylacrylamide were added to 70 cc. of water containing 0.1 g. of sodium bisulfite and 9.0 g. of acrylonitrile. The resulting solution was then polymerized for 16 hours at 35° C. The polymer was filtered off and then dried. It was obtained in an 80 percent yield and was found to contain 17 percent by weight of the N-methylacrylamide-acrylamide interpolymer on analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 10 parts polyacrylonitrile and 90 parts of the above polymer and extruding the solution into a precipitating bath, had a tenacity of 3.1 g. per denier, an extensibility of 21 percent, a sticking temperature of 215° C. and shrank only 8 percent in boiling water.

Example 6

4.0 g. of poly-N,N-dimethylmethacrylamide were dissolved in 75 cc. of acetonitrile containing 6.5 g. of acrylonitrile and 0.3 g. of benzoyl peroxide. The resulting solution was then heated for 24 hours at 50° C., and then cooled. The precipitated polymer was collected on a filter, washed, and dried. It was found to contain 39 percent by weight of N,N-dimethylmethacrylamide on analysis.

The polymers can be mixed with polyacrylonitrile in all proportions and dissolved to give stable solutions which do not separate into distinct layers on standing and from which fibers and films of homogeneous character can be spun, extruded or cast.

Example 7

3.0 g. of an interpolymer of citraconic diamide and methyl methacrylate containing 28 percent by weight of the diamide were emulsified in 100 cc. of water containing 3 cc. of a sulfonated ether such as an aryloxy polyalkylene ether sulfonate (Triton 720). There was then added 7.0 g. of acrylonitrile, 0.15 g. of potassium persulfate, and 0.1 g. of sodium bisulfite. The resulting emulsion was heated for 16 hours at 35° C., and then cooled to room temperature. The precipitated polymer was collected on a filter, washed and dried. It contained 28 percent by weight of the citraconic diamide-methyl methacrylate interpolymer on analysis.

The polymers can be mixed with polyacrylonitrile in all proportions and dissolved to give stable solutions which do not separate into distinct layers on standing and from which fibers and films of homogeneous character can be spun, extruded or cast.

Example 8

9.5 g. of poly-N,N'-dimethylitaconic diamide were emulsified in 80 cc. of water containing 3 cc. of 7-methyl-2-methylundecan-4-sulfonic acid sodium salt (Tergitol No. 4). There was then added .5 g. of acrylonitrile, 0.05 g. of potassium persulfate, and 0.05 g. of sodium bisulfite, and the emulsion was heated at 35° C. for 16 hours with tumbling. The emulsion was then cooled to room temperature, the precipitated polymer filtered off, washed with distilled water, and dried. It was found to contain 5 percent acrylonitrile by analysis.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 90 parts of polyacrylonitrile and 10 parts of the above polymer and extruding the solution into a precipitating bath, had a tenacity of 3.1 g. per denier, an extensibility of 20 percent, a sticking temperature of 210° C. and shank only 7 percent in boiling water.

Example 9

9 g. of an interpolymer of acrylamide and methyl acrylate containing 80 percent by weight of acrylamide were dissolved in 100 cc. of water containing .05 g. of potassium persulfate, .05 g. of sodium bisulfite, and 1 g. of acrylonitrile. The resulting solution was then heated for 16 hours at 35° C. The solution was cooled to room temperature and the precipitated polymer filtered off, washed with distilled water, and finally dried.

The polymers can be mixed with polyacrylonitrile in all proportions and dissolved to give stable solutions which do not separate into distinct layers on standing and from which fibers and films of homogeneous character can be spun, extruded or cast.

A solution of a mechanical mixture of 50 parts polyacrylonitrile and 50 parts of the above polymer was cast to give a clear, tough film.

*Example 10*

8 g. of poly-N-methylmethacrylamide were dissolved in 100 cc. of water to which 1/10 g. of ammonium persulfate and 1/10 g. of sodium bisulfite, and 2 g. of acrylonitrile were added. The resulting solution was heated for 16 hours at 30° C., then cooled to room temperature. The precipitated polymer was filtered off, washed with distilled water, and then dried.

The polymers can be mixed with polyacrylonitrile in all proportions and dissolved to give stable solutions which do not separate into distinct layers on standing and from which fibers and films of homogeneous character can be spun, extruded or cast.

*Example 11*

6 g. of an interpolymer of N-methylmethacrylamide and acrylonitrile containing 70 percent by weight of N-methylmethacrylamide were dissolved in 100 cc. of water containing 0.1 g. of potassium persulfate, 0.1 g. of sodium bisulfite, and 4 g. of acrylonitrile. The resulting solution was then heated for 12 hours at 35° C. The solution was cooled to room temperature, and the precipitated polymer filtered off, washed, and dried.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture containing 50 parts polyacrylonitrile and 50 parts of the above polymer and extruding the solution into a precipitating bath had a tenacity of 3.2 g. per denier, an extensibility of 23 percent, a sticking temperature of 210° C., and shrank only 8 percent in boiling water.

The mixtures of the invention which have a combined acrylonitrile content by weight of from 60 to 95 percent, the remainder of the composite composition being made up of other of the mentioned components of the invention, are particularly useful for preparing fiber-forming materials. However, the above compositions, together with the composite compositions which have a combined acrylonitrile content by weight of from 5 to 60 percent, the remainder of the composite composition in each case being made up of other of the mentioned components of the invention, can all be made up into solutions or dopes in the mentioned solvents, with or without fillers, pigments, dyes, plasticizers, etc., as desired, and the dopes coated on a smooth surface to give flexible and tough films and sheet materials, which are useful for photographic film support and other purposes.

Other solvents which can be used for the preparation of fibers and coating compositions from the new polymer mixtures of our invention include ethylene carbamate, N-methyl-2-pyrrolidone, N,N-dimethylmethoxyacetamide, dimethyl cyanamide, N,N-dimethyl cycanoacetamide, N,N-dimethyl-β-cyanopropionamide, glycolonitrile (formaldehyde cyanohydrin), malononitrile, dimethylsulfoxide, dimethyl sulfone, tetramethylene sulfone, tetramethylene sulfoxide, N-formylpyrrolidine, N-formylmorpholine, N,N'-tetramethylene methanephosphonamide, and the like.

In addition to the above-described mixtures, we have found that the acrylonitrile polymers containing alkenyl carbonamides can also be mixed with each other or with other acrylonitrile polymers containing at least 85 percent by weight of acrylonitrile and 15 percent by weight of another monoethylenically unsaturated, polymerizable compound containing a —CH=< group or a CH$_2$=< group, to give generally similar stable homogeneous solutions.

What we claim is:

1. A mixture consisting of (1) from 5 to 95 parts by weight of a graft copolymer consisting of from 5 to 95% by weight of acrylonitrile and from 95 to 5% by weight of a preformed isolated polymer selected from the group consisting of a homopolymer of an unsaturated amide compound represented by the following general formula:

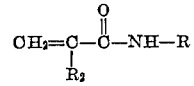

wherein R represents an alkyl group containing from 1 to 4 carbon atoms and $R_2$ represents a member selected from the group consisting of a hydrogen atom and a methyl group, and an interpolymer consisting of from 25 to 95% by weight of the said unsaturated amide compound and 75 to 5% by weight of acrylonitrile and (2) from 95 to 5 parts by weight of polyacrylonitrile, the total weight of acrylonitrile in the said mixture being at least 60% and the weight of the said preformed isolated polymer in the said mixture being at least 5%.

2. A mixture consisting of (1) from 5 to 95 parts by weight of a graft copolymer consisting of from 5 to 95% by weight of acrylonitrile and from 95 to 5% by weight of preformed isolated poly-N-methyl methacrylamide and (2) from 95 to 5 parts by weight of polyacrylonitrile, the total weight of acrylonitrile in the said mixture being at least 60% and the weight of the said preformed isolated poly-N-methyl methacrylamide in the said mixture being at least 5%.

3. A mixture consisting of (1) from 5 to 95 parts by weight of a graft copolymer consisting of from 5 to 95% by weight of acrylonitrile and from 95 to 5% by weight of preformed isolated poly-N-isopropylacrylamide and (2) from 95 to 5 parts by weight of polyacrylonitrile, the total weight of acrylonitrile in the said mixture being at least 60% and the weight of the said preformed isolated poly-N-isopropylacrylamide in the said mixture being at least 5%.

4. A mixture consisting of (1) from 5 to 95 parts by weight of a graft copolymer consisting of from 5 to 95% by weight of acrylonitrile and from 95 to 5% by weight of a preformed isolated interpolymer consisting of from 25 to 95% by weight of N-methyl methacrylamide and from 75 to 5% by weight of acrylonitrile and (2) from 95 to 5 parts by weight of polyacrylonitrile, the total weight of acrylonitrile in the said mixture being at least 60% and the weight of the said preformed isolated interpolymer in the said mixture being at least 5%.

References Cited in the file of this patent

UNITED STATES PATENTS

| | | |
|---|---|---|
| 2,067,234 | Gordon et al. | Jan. 12, 1937 |
| 2,133,257 | Strain | Oct. 11, 1938 |
| 2,311,548 | Jacobson et al. | Feb. 16, 1943 |
| 2,425,192 | Kropa | Aug. 5, 1947 |
| 2,589,055 | Coover et al. | Mar. 11, 1952 |
| 2,620,324 | Coover et al. | Dec. 2, 1952 |
| 2,649,434 | Coover et al. | Aug. 18, 1953 |
| 2,688,008 | Chaney et al. | Aug. 31, 1954 |